April 30, 1935. F. E. McGILLICUDDY ET AL  1,999,336
ANTITHEFT DEVICE FOR GASOLINE TANKS
Filed June 19, 1933    2 Sheets-Sheet 1

Inventors
F. E. McGillicuddy
M. P. Mockler
By Clarence A. O'Brien
Attorney

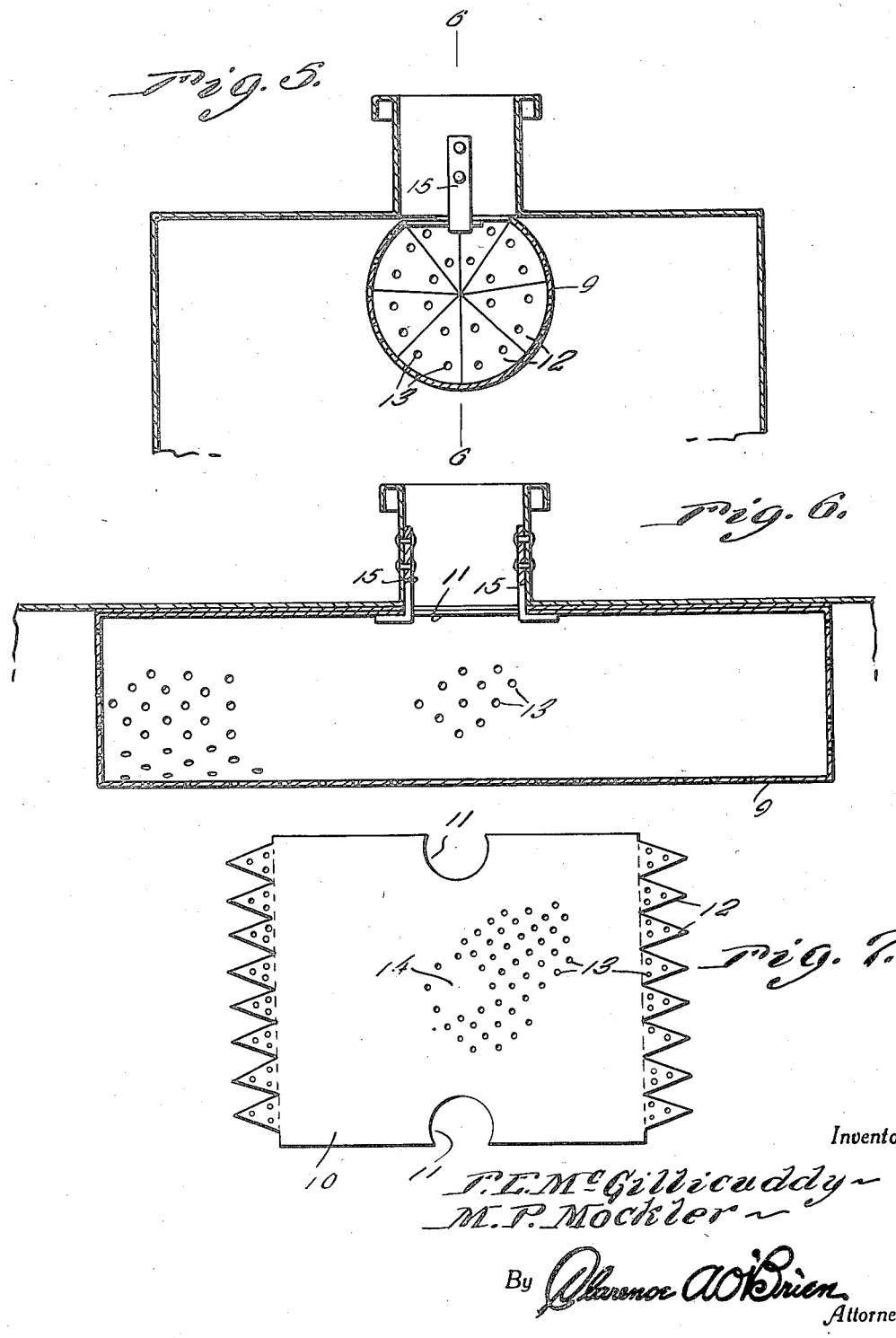

Patented Apr. 30, 1935

1,999,336

UNITED STATES PATENT OFFICE 1,999,336

ANTITHEFT DEVICE FOR GASOLINE TANKS

Frank E. McGillicuddy and Martin P. Mockler, Cleveland, Ohio

Application June 19, 1933, Serial No. 676,570

4 Claims. (Cl. 220—86)

This invention relates to an anti-theft device for gasoline tanks and the like, the general object of the invention being to provide means for preventing one from syphoning gasoline from a tank of an automobile or the like.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 5 is a transverse sectional view through a tank, showing a modified form of the invention therein.

Figure 6 is a section on line 6—6 of Figure 5.

Figure 7 is a view of the blank from which the cylinder is formed.

As shown in these views, we provide a member 1 which is located in the upper part of the tank and extends an appreciable distance around the filling neck 2 of the tank A, said member having its ends turned upwardly, as shown at 3, to close the ends of the space formed by said member and the top part of the tank and the major portion of said member and its ends 3 are perforated, as shown at 4, so that gasoline being poured into the tank through the filling neck will pass through the perforations into the tank. That part 5 of the member directly under the spout or neck 2 is imperforate so that a small hose or the like cannot be passed through this portion as it could if said portion was perforated.

Figure 1:
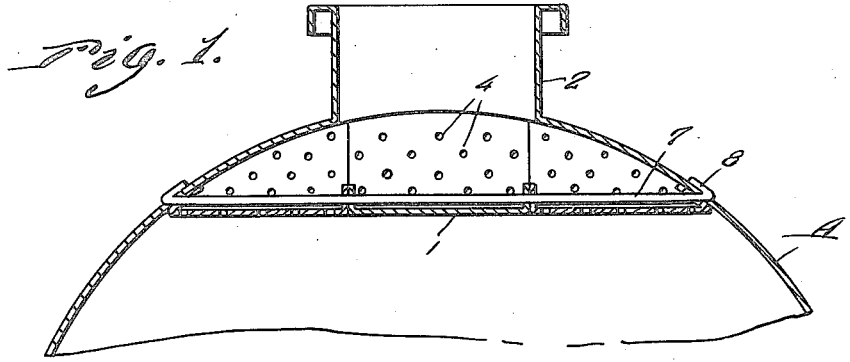
Figure 1 is a sectional view through a tank equipped with the invention.

In that form of the invention shown in Figure 1, the member is composed of a number of longitudinally extending sections 1', each of which has its ends turned up to provide the vertical portions 3 and said sections are provided with the centrally arranged perforated ears 6 through which passes a rod 7 which also passes through holes in the side portions of the tank, with it ends turned upwardly, as shown at 8, and soldered or otherwise fastened to the tank. Each section is of a width to permit it to be passed into the tank through the neck so that the device can be put in place in tanks as now constructed.

Figure 4:
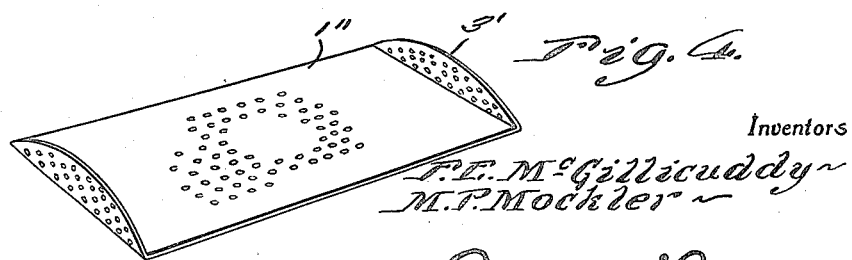
Figure 4 is a view of a modified form of the device.

Figure 4 shows the member 1'' as formed of one piece of material with its ends turned up, as shown at 3' and these ends are soldered, welded or otherwise attached to the interior part of the tank and this member is also perforated, though that portion under the neck is not perforated, as shown in Figure 4.

Thus it will be seen that it will be impossible for anyone to place a tube in the tank and attempt to syphon gasoline therefrom, though gasoline can be placed in the tank as the gasoline will pass through the perforations.

In the modification shown in Figures 5, 6 and 7, the device is made in the form of a cylinder 9 which is constructed from a sheet 10 of sheet metal or the like. This sheet is provided with an opening or recess 11 in the central part of each side edge thereof and has its ends cut to provide the points 12 and the major portion of the sheet, as well as these points, are perforated, as at 13, though an area at the center of the sheet is left free of perforations, as shown at 14.

The sheet is rolled into cylindrical form and the points 12 turned at right angles, these points closing the ends of the cylinder and the cylinder is contracted, with its side edges overlapping, so that it can be passed through the filling neck of the tank. The cylinder is then manipulated to place it in the top of the tank, as shown in Figures 5 and 6, with the recesses 11 forming an opening, registering with the neck and with the imperforate part 14 under said opening and neck. The device is held in position by angle brackets 15 riveted or otherwise fastened to the inner walls of the neck with portions of the brackets extending under the top part of the cylinder, as shown in Figures 5 and 6. If the cylinder cannot be placed close enough to the top of the tank to prevent a space being formed between the junction of the neck with the tank and the adjacent parts of the cylinder, the top part of the cylinder, where the side edges overlap, may be flattened, as shown in Figure 5.

Figure 2:
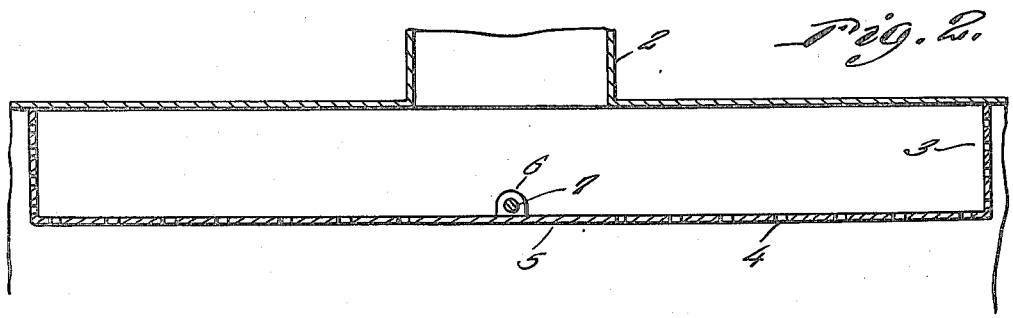
Figure 2 is a fragmentary longitudinal sectional view.
Figure 3:
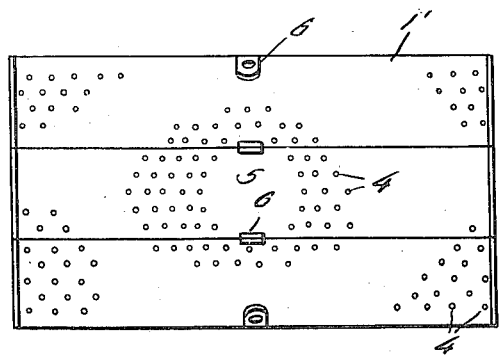
Figure 3 is a view of the device itself.

As will be understood, that form of the invention shown in Figures 1, 2 and 3 and the form shown in Figures 5, 6 and 7 are adapted to be placed in a tank already constructed and that form of the invention shown in Figure 4 is adapted to be built into the tank when the tank is being formed.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with a tank having a filling neck, a cylinder located in the upper part of the tank and having an opening therein in communication with the neck, said cylinder having its major portion perforated and its ends closed by perforated parts, that part of the cylinder directly under the opening therein being imperforate.

2. In combination with a tank having a filling neck, a perforated member located in the upper portion of the tank and forming a chamber between itself and the top part of the tank, with the chamber in communication with the neck, said member including a flat part having its side edges contacting the side walls of the tank adjacent the top part of the tank and turned-up end portions having their upper ends contacting the upper walls of the tank, said member being formed of a number of longitudinally extending strips of a width to be passed through the neck, each strip including a flat portion and turned-up end portions, and means for holding the strips in position with their side edges abutting, that portion of the member located under the neck being imperforate.

3. In combination with a tank having a filling neck in its top, a horizontally arranged member supported in the upper part of the tank and including a flat bottom forming part having its side edges lying in the same horizontal plane with the rest of the member, said edges abutting portions of the side parts of the tank with the ends of the member turned up and abutting top portions of the tank, said member forming a chamber between itself and portions of the top part of the tank, the central part of the chamber being in communication with the neck and said turned-up end portions and the major portion of the bottom portion being perforated, with the perforations placed close together and opening out directly into the tank while that portion of the bottom part directly under the neck being imperforate said bottom-forming part having its entire portion lying in the same horizontal plane.

4. In combination with a tank having a filling neck in its top part, a horizontally arranged elongated member supported in the upper part of the tank and extending longitudinally thereof and forming a chamber of much greater area than the cross sectional area of the neck, the central portion of said chamber being in communication with the neck, the entire portion of said member excepting that portion directly under the neck being perforated, with the perforations arranged close together, said perforations communicating the chamber directly with the tank and said member having its ends spaced from the ends of the tank and said ends of the member being vertically arranged.

FRANK E. McGILLICUDDY.
MARTIN P. MOCKLER.